Sept. 20, 1949.  E. W. WORLEY  2,482,605

PAN SCOURING IMPLEMENT

Filed May 5, 1948

INVENTOR.
Ernest W. Worley
BY
ATTORNEY.

Patented Sept. 20, 1949

2,482,605

UNITED STATES PATENT OFFICE 2,482,605

PAN SCOURING IMPLEMENT

Ernest W. Worley, Kansas City, Kans.

Application May 5, 1948, Serial No. 25,165

1 Claim. (Cl. 15—209)

This invention relates to devices used particularly in the home and more specifically to a pan scouring implement in the nature of a hollow body provided with a mass of inter-entangled wire shavings commonly used in cleansing and removing foreign matter from cooking utensils and the like.

The most important object of this invention is to provide an implement for scouring pans having a tubular body provided with a plurality of inturned spurs at one end thereof for yieldably holding a mass of metallic shavings in place, said body being provided with a reciprocable member for progressively forcing the shavings from one end of the body past the spurs.

Another important object of this invention is to provide a pan scouring implement wherein the reciprocable member is provided with an out-turned annular flange bearing against the innermost face of the tubular body for rendering the same substantially water-tight.

Another object of this invention is to provide an implement of the aforesaid character wherein the innermost movable member has a head extending beyond the liquid seal thereof, which head is of such size as to pass between the inturned spurs of the body, to the end that the last bit of metallic shavings may be utilized.

Other objects of this invention include the manner in which the innermost member is actuated by an external, threadedly-mounted cap and many minor details of construction which render the implement easy and cheaply constructed, attractive in appearance, sturdy and highly efficient for the purposes contemplated.

Figure 1:
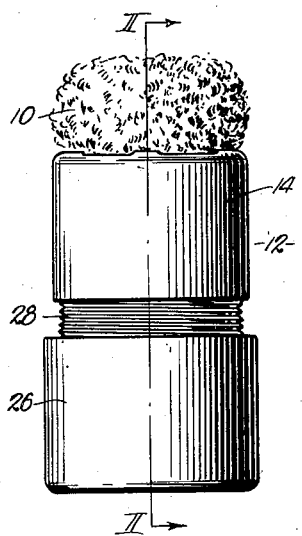
Fig. 1 is a side elevational view of a pan scouring implement made in accordance with the present invention.

The device about to be described has been developed for effectively holding a mass of inter-entangled metallic shavings designated by the numeral 10. As is well known in the art, such shavings may be used and have been used for effectively scouring pots and pans and other kitchen utensils and usually takes the form of steel wool, copper shavings or other metallic cuttings.

When used without a holder of any nature whatsoever, one disadvantage lies in the damage to the hands of the user, since oftentimes small particles of the shavings break off into the fingers of the user and because of the scratching and cutting thereof. Furthermore, once used, the shavings become greasy, soggy and filled with the foreign matter removed from the utensils and, as a result, is disagreeable to handle. Much waste is common because the shavings are usually discarded long before they are completely used.

Accordingly, the holder forming the subject matter of this invention has been provided to eliminate all of the aforesaid disadvantages, and this holder has been specially designed to permit use of virtually every particle of the shavings before the same need be discarded and the holder refilled.

The holder, per se, illustrated in the drawing is broadly designated by the numeral 12 and includes a tubular body 14. Body 14 has both of its ends open, and one of such ends has a plurality of inturned spurs 16 spaced along its innermost periphery.

Figure 2:
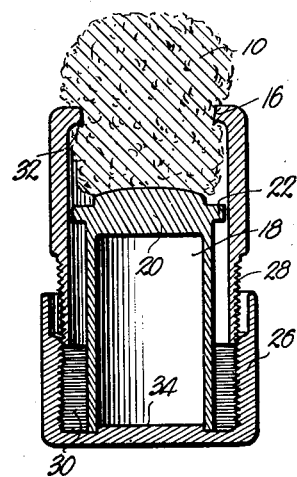
Fig. 2 is a substantially central longitudinal cross-sectional view taken on line II—II of Fig. 1.
Figure 3:
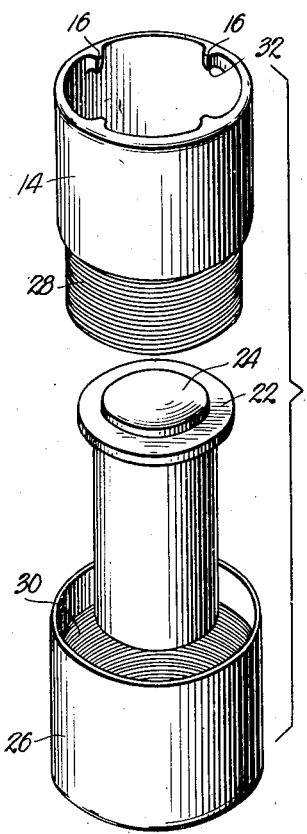
Fig. 3 is a stretched-out perspective view of all of the component parts of the implement, per se; and, Fig. 4 is an end view showing the holding spurs and with the metallic shavings entirely removed.
Figure 4:
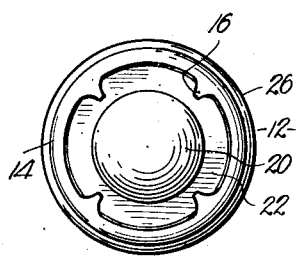

As clearly indicated in Fig. 2, the metallic shavings 10 are disposed within the tubular body 14 with a portion thereof extending outwardly beyond body 14 and with the spurs 16 extending thereinto. Since the shavings 10 are light and fluffy, these spurs 16 will readily imbed within such shavings 10 and yieldably lock therewith.

A reciprocable member 18 is telescopically mounted within the body 14 and is preferably hollow throughout the greater portion of its length for purposes of lightness and cheapness of construction. One end of this tubular member 18 has a closed end 20 which, in turn, is provided with a continuous annular out-turned flange 22. The diameter of the flange 22 of member 18 is substantially the same as the inside diameter of the body 14 and greater than the distance between spurs 16, to the end that, as member 18 is reciprocated, flange 22 will slidably engage the inner-most wall of body 14. By such construction, it is apparent that, when the device is placed in use, water or other liquid passing through the shavings 10 will be held back against further entrance into body 14.

Member 18 is provided with a head 24 exteriorly of the end wall 20 thereof. This head 24 is dome-like and has a diameter less than the distance between opposed spurs 16. The height of this head 24 is substantially the same or greater than the thickness of spurs 16 from the outermost face thereof toward the interior of body 14.

Accordingly, when the member 18 is moved toward that end of body 14 having spurs 16 thereon, metallic shavings 10 will be forced outwardly and, since the head 24 will pass between the spurs 16, virtually all of the shavings 10 can be utilized before refilling of the holder 12 becomes necessary.

Such outward movement of the member 18 is effected by manipulation of a cup-shaped cap 26. That end of the body 14 opposite to the spurs 16 is provided with external threads 28 that mesh with internal threads 30 formed on the cap 26 and, as indicated in the drawing, such cap 26 telescopes and closes this said threaded end of body 14.

The inner-most end of member 18 rests directly upon the innermost face of the bottom wall of cap 26. When the cap 26 is manipulated to move member 18 inwardly against the shavings 10, the latter will be moved outwardly and, since such shavings 10 are loosely inter-entangled, the spurs 16 will permit such outward movement of the shavings 10 and at the same time hold the same against complete displacement from the holder 12.

It is obviously to be noted further that the inturned spurs 16 formed on body 14 have at their innermost free ends an ear 32 that extends toward the end of body 14 having threads 28 thereon. Since these ears 32 extend oppositely to the direction of travel of shavings 10 when member 18 is actuated, further assurance against displacement of the shavings 10 is provided.

Another feature of this device lies in an inwardly-extending, centrally-disposed shoulder 34 formed on the inner-most face of the bight of cap 26. This shoulder 34 is circular and has a diameter substantially the same as the inside diameter of the member 18, to the end that the proximal end of such member 18 is held in a centered position with respect to the cap 26 and the body 14.

The filling may take place by either forcing the new ball of shavings 10 into the open end of body 14 after manipulation of cap 26 to move member 18 to the inner-most ends of its path of travel. Or, if desired, the cap 26 may be entirely removed together with member 18 and the shavings 10 moved into the opposite end of body 14. Any suitable material may be used for making the component parts of the holder 12, and it is contemplated that a plastic composition be used, since the same is light, inexpensive and can be produced in any number of attractive colors.

Manifestly, while only one embodiment of the present invention has been illustrated and described, such changes and modifications as fairly come within the scope of the appended claim are contemplated hereby.

Having thus described my invention, what I claim as new and desire secured by Letters Patent is:

A scouring implement of the kind described comprising a tubular body; a mass of inter-entangled metal shavings in said body and extending beyond one end thereof; a plurality of inturned spurs formed in said body adjacent said one end thereof and extending into said shavings for holding the latter against displacement from the body; a reciprocable member in the body for forcing said shavings outwardly from the body; and an out-turned flange on said member adjacent the shavings and slidably bearing against the inner-most face of the body to present a liquid seal, the end of the member adjacent the shavings being smaller than the distance between the spurs whereby substantially all of said shavings may be forced from the body by the member.

ERNEST W. WORLEY.

REFERENCES CITED

The following references are of record in the file of this patent:

UNITED STATES PATENTS

| Number | Name | Date |
|---|---|---|
| 1,994,795 | Stoker | Mar. 19, 1935 |
| 2,012,500 | Ebert et al. | Aug. 27, 1935 |
| 2,407,404 | Dessaur | Sept. 10, 1946 |
| 2,441,268 | Haber | May 11, 1948 |

FOREIGN PATENTS

| Number | Country | Date |
|---|---|---|
| 647,875 | Germany | July 15, 1937 |